United States Patent
Park et al.

(10) Patent No.: US 10,626,266 B2
(45) Date of Patent: Apr. 21, 2020

(54) THERMOPLASTIC RESIN COMPOSITION AND MOLDED PRODUCT USING THE SAME

(71) Applicant: Lotte Advanced Materials Co., Ltd., Yeosu-si (KR)

(72) Inventors: Jieun Park, Uiwang-si (KR); Keehae Kwon, Uiwang-si (KR); Doo Young Kim, Uiwang-si (KR); Hyeongseob Shin, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 19 days.

(21) Appl. No.: 15/844,733

(22) Filed: Dec. 18, 2017

(65) Prior Publication Data

US 2018/0171131 A1   Jun. 21, 2018

(30) Foreign Application Priority Data

Dec. 20, 2016 (KR) ........................ 10-2016-0174890

(51) Int. Cl.
*C08L 25/12* (2006.01)

(52) U.S. Cl.
CPC ........... *C08L 25/12* (2013.01); *C08L 2201/08* (2013.01); *C08L 2205/03* (2013.01); *C08L 2205/035* (2013.01)

(58) Field of Classification Search
CPC .. C08L 25/12; C08L 2201/08; C08L 2205/03; C08L 2205/035
See application file for complete search history.

(56) References Cited

U.S. PATENT DOCUMENTS

| | | | |
|---|---|---|---|
| 7,135,520 | B2 | 11/2006 | Chang et al. |
| 9,422,426 | B2 | 8/2016 | Kwon et al. |
| 2012/0172502 | A1 | 7/2012 | Lee et al. |
| 2012/0264869 | A1 | 10/2012 | Lee et al. |
| 2012/0270988 | A1 | 10/2012 | Lee et al. |

FOREIGN PATENT DOCUMENTS

| | | |
|---|---|---|
| CN | 103910967 A | 7/2014 |
| JP | 09-194631 A | 7/1997 |
| JP | 2001-262003 A | 9/2001 |
| JP | 2005-179445 A | 7/2005 |
| JP | 2012-188571 A | 10/2012 |
| KR | 10-0541061 B1 | 1/2006 |
| KR | 10-0726486 B1 | 6/2007 |
| KR | 10-0781128 B1 | 11/2007 |
| KR | 10-2008-0112842 A | 12/2008 |
| KR | 10-2009-0072651 A | 7/2009 |
| KR | 10-2011-0079465 A | 7/2011 |
| KR | 10-2012-0050138 | 5/2012 |
| KR | 10-2012-0075724 A | 7/2012 |
| KR | 10-2015-0001991 A | 1/2015 |
| KR | 10-2015-0076534 A | 7/2015 |
| KR | 10-2015-0124598 A | 11/2015 |
| KR | 10-2015-0139441 A | 12/2015 |
| KR | 10-2016-0052058 | 5/2016 |

OTHER PUBLICATIONS

Office Action and Search Report in counterpart Chinese Application Serial No. 201711374012.0 dated Sep. 20, 2019, pp. 1-6.
English-translation of Office Action and Search Report in counterpart Chinese Application Serial No. 201711374012.0 dated Sep. 20, 2019, pp. 1-6.

*Primary Examiner* — Edward J Cain
(74) *Attorney, Agent, or Firm* — Additon, Higgins & Pendleton, P.A.

(57) ABSTRACT

Disclosed are a thermoplastic resin composition including (C) about 1 part by weight to about 6 parts by weight of a copolymer including a styrene-acrylonitrile copolymer graft-copolymerized on polystyrene and having a weight average molecular weight of greater than or equal to about 1,000,000 g/mol and (D) about 0.1 part by weight to about 1 part by weight of an aluminum particle, based on about 100 parts by weight of a base resin including (A) about 25 wt % to about 45 wt % of an acryl-based graft copolymer; and (B) about 55 wt % to about 75 wt % of an aromatic vinyl-vinyl cyanide copolymer, and a molded product using the same.

13 Claims, No Drawings

THERMOPLASTIC RESIN COMPOSITION AND MOLDED PRODUCT USING THE SAME

CROSS-REFERENCE TO RELATED APPLICATION

This application claims priority to and the benefit of Korean Patent Application No. 10-2016-0174890 filed in the Korean Intellectual Property Office on Dec. 20, 2016, the entire disclosure of which is incorporated herein by reference.

FIELD

The present disclosure relates to a thermoplastic resin composition and a molded product using the same.

BACKGROUND

Recently, thermoplastic resins have replaced conventional glass or metal materials in electric/electronic products, automobiles, construction materials, leisure products, and the like. The thermoplastic resins should satisfy requirements such as impact resistance, weather resistance, workability and high quality appearance.

Generally, when an acrylonitrile-butadiene-styrene resin (hereinafter, ABS resin) is used as the thermoplastic resin, π-bond of the butadiene-based rubbery polymer is stimulated by UV to be unfavorably decomposed, which can cause discoloring or cracking a product. Therefore, an acrylonitrile-styrene-acrylate resin (hereinafter, ASA resin) using an acryl-based rubbery polymer instead of the butadiene-based rubbery polymer is known as a substitute to solve the UV-decomposition problem since the acryl-based rubbery polymer has no π-bond. In addition, the ASA resin has merits of excellent formability, chemical resistance, thermal stability and the like and a lower specific gravity than glass or metal.

Meanwhile, recently, there is increased demand for an environmentally-friendly non-coated resin with a metal-like texture material capable of having a metallic paint-like appearance.

A thermoplastic resin composition can include metal particles to provide a metal-like texture as an alternative to a painted product. When the metal particles are added into the thermoplastic resin composition, however, impact resistance, weather resistance, and the like may be deteriorated, and the appearance of a molded product may be deteriorated when it is injection-molded, so the application thereof is limited.

U.S. Pat. No. 7,135,520 disclosed that the appearance is improved by using a mixture of milled glass fiber and chopped glass fiber. The appearance improvement effect, however, can be insufficient, and mechanical strength can be deteriorated.

Japanese Patent Laid-Open Publication No. 2001-262003 discloses the use of metal particles for the metal-like texture. A flow mark or a weld line, however, can form during injection molding.

Accordingly, there is a need for a thermoplastic resin composition that can be used, for example, as an exterior material, having a metal texture while maintaining impact resistance and weather resistance of the thermoplastic resin.

SUMMARY

An embodiment provides a thermoplastic resin composition that can realize (exhibit) an excellent metal-like texture.

Another embodiment provides a molded product using the thermoplastic resin composition.

According to an embodiment, a thermoplastic resin composition includes (C) about 1 part by weight to about 6 parts by weight of a copolymer including a styrene-acrylonitrile copolymer graft-copolymerized on polystyrene and having a weight average molecular weight of greater than or equal to about 1,000,000 g/mol and (D) about 0.1 part by weight to about 1 part by weight of an aluminum particle, each based on about 100 parts by weight of a base resin including (A) about 25 wt % to about 45 wt % of an acryl-based graft copolymer; and (B) about 55 wt % to about 75 wt % of an aromatic vinyl-vinyl cyanide copolymer.

The acryl-based graft copolymer (A) may include about 40 wt % to about 60 wt % of a mixture of an aromatic vinyl compound and a vinyl cyanide compound graft-copolymerized on about 40 wt % to about 60 wt % of an acryl-based rubbery polymer.

The acryl-based graft copolymer (A) may include an acryl-based rubbery polymer having an average particle diameter of about 150 nm to about 400 nm.

The aromatic vinyl-vinyl cyanide copolymer (B) may be selected from a copolymer of styrene and acrylonitrile, a copolymer of α-methyl styrene and acrylonitrile, and a copolymer of styrene, α-methyl styrene, and acrylonitrile.

The aromatic vinyl-vinyl cyanide copolymer (B) may be a styrene-acrylonitrile copolymer (SAN) wherein about 65 wt % to about 75 wt % of styrene and about 25 wt % to about 35 wt % of acrylonitrile are copolymerized.

A weight average molecular weight of the styrene-acrylonitrile copolymer (SAN) may range from about 90,000 g/mol to about 150,000 g/mol.

An average particle diameter (D50) of the aluminum particle may range from about 10 μm to about 50 μm.

The copolymer (C) including a styrene-acrylonitrile copolymer graft-copolymerized on polystyrene and having a weight average molecular weight of greater than or equal to about 1,000,000 g/mol and the aluminum particle (D) may be included in a weight ratio of about 100:10 to about 100:50.

The copolymer (C) including a styrene-acrylonitrile copolymer graft-copolymerized on polystyrene and having a weight average molecular weight of greater than or equal to about 1,000,000 g/mol and the aluminum particle (D) may be included in a weight ratio of about 100:15 to about 100:35.

The thermoplastic resin composition may further include about 1 part by weight to about 10 parts by weight of an acrylonitrile-butadiene-styrene graft copolymer (g-ABS) based on about 100 parts by weight of the base resin.

The acrylonitrile-butadiene-styrene graft copolymer (g-ABS) may include a butadiene-based rubbery polymer having an average particle diameter of about 200 nm to about 340 nm.

The thermoplastic resin composition may further include at least one of an ultraviolet (UV) stabilizer, a fluorescent whitening agent, a release agent, a nucleating agent, an inorganic material additive, a lubricant, an antistatic agent, a heat stabilizer, an impact-reinforcing agent, a pigment, and a dye.

According to another embodiment, a molded product using the thermoplastic resin composition is provided.

DETAILED DESCRIPTION

The present invention will be described more fully hereinafter with reference to the accompanying drawing, in which exemplary embodiments of the present invention are shown. This invention may, however, be embodied in many different forms and should not be construed as limited to the exemplary embodiments set forth herein. These exemplary embodiments disclosed in this specification are provided so that this disclosure will satisfy applicable legal requirements.

As used herein, "copolymerization" may refer to a block copolymerization and/or a random copolymerization and "copolymer" may refer to a block copolymer and/or a random copolymer.

An embodiment provides a thermoplastic resin composition capable of realizing an improved metal-like texture with minimal or no deterioration of impact resistance and/or weather resistance.

The thermoplastic resin composition includes (C) about 1 part by weight to about 6 parts by weight of a copolymer including a styrene-acrylonitrile copolymer graft-copolymerized on polystyrene and having a weight average molecular weight of greater than or equal to about 1,000,000 g/mol and (D) about 0.1 part by weight to about 1 part by weight of an aluminum particle, each based on about 100 parts by weight of a base resin including (A) about 25 wt % to about 45 wt % of an acryl-based graft copolymer; and (B) about 55 wt % to about 75 wt % of an aromatic vinyl-vinyl cyanide copolymer.

Hereinafter, each component is described in more detail.
(A) Acryl-Based Graft Copolymer In an embodiment of the present disclosure, the acryl-based graft copolymer (A) may include about 40 wt % to about 60 wt % of a monomer mixture of an aromatic vinyl compound and a vinyl cyanide compound graft-copolymerized on about 40 wt % to about 60 wt % of an acryl-based rubbery polymer.

The polymerization may include any conventional commonly-used manufacturing methods known in the art, for example, an emulsion polymerization, a suspension polymerization, a solution polymerization, a massive polymerization, and the like.

The acryl-based rubbery polymer may be an alkyl acrylate-based rubber, for example a C2 to C10 alkyl acrylate rubber. Examples of the alkyl acrylate-based rubber may include a butyl acrylate rubber, an ethyl hexyl acrylate rubber, and a mixture thereof, but are not limited thereto.

The acryl-based rubbery polymer may be included in an amount of about 40 wt % to about 60 wt % (solid basis) based on the total weight (100 wt %) of the acryl-based graft copolymer (A). In some embodiments, the acryl-based graft copolymer may include the acryl-based rubbery polymer in an amount of about 40, 41, 42, 43, 44, 45, 46, 47, 48, 49, 50, 51, 52, 53, 54, 55, 56, 57, 58, 59, or 60 wt %. Further, according to some embodiments, the amount of the acryl-based rubbery polymer may be in a range from about any of the foregoing amounts to about any other of the foregoing amounts.

The acryl-based rubbery polymer may have an average particle diameter of about 150 nm to about 400 nm, for example, of about 180 nm to about 320 nm. The average particle diameter of the acryl-based rubbery polymer is measured using a photographic length of the subject particle obtained by a transmission electron microscope (TEM), and averaged from 100 subject particles. Methods for measuring average particle diameter using TEM are well known in the art and the meaning of the average particle diameter is understood by the skilled artisan.

The monomer mixture of the aromatic vinyl compound and the vinyl cyanide compound graft-copolymerized on the rubbery polymer may include about 60 wt % to about 80 wt % of the aromatic vinyl compound and about 20 wt % to about 40 wt % of the vinyl cyanide compound, each based on the total weight (100 wt %) of the aromatic vinyl compound and the vinyl cyanide compound.

In some embodiments, the monomer mixture may include the aromatic vinyl compound in an amount of about 60, 61, 62, 63, 64, 65, 66, 67, 68, 69, 70, 71, 72, 73, 74, 75, 76, 77, 78, 79, or 80 wt %. Further, according to some embodiments, the amount of the aromatic vinyl compound may be in a range from about any of the foregoing amounts to about any other of the foregoing amounts.

In some embodiments, the monomer mixture may include the vinyl cyanide compound in an amount of about 20, 21, 22, 23, 24, 25, 26, 27, 28, 29, 30, 31, 32, 33, 34, 35, 36, 37, 38, 39, or 40 wt %. Further, according to some embodiments, the amount of the vinyl cyanide compound may be in a range from about any of the foregoing amounts to about any other of the foregoing amounts.

The monomer mixture of the aromatic vinyl compound and the vinyl cyanide compound may be included in an amount of about 40 wt % to about 60 wt % based on the total weight (100 wt %) of the acryl-based graft copolymer (A). In some embodiments, the acryl-based graft copolymer may include the monomer mixture in an amount of about 40, 41, 42, 43, 44, 45, 46, 47, 48, 49, 50, 51, 52, 53, 54, 55, 56, 57, 58, 59, or 60 wt %. Further, according to some embodiments, the amount of the monomer mixture may be in a range from about any of the foregoing amounts to about any other of the foregoing amounts.

Examples of the aromatic vinyl compound may include without limitation styrene, α-methyl styrene, p-methyl styrene, p-t-butyl styrene, 2,4-dimethyl styrene, chloro styrene, vinyl toluene, vinyl naphthalene, and the like, which may be used alone or in a mixture. For example, styrene may be used.

Examples of the vinyl cyanide compound may include without limitation acrylonitrile, methacrylonitrile, fumaronitrile, and the like, which may be used alone or in a mixture. Among them, acrylonitrile may be used.

The acryl-based graft copolymer may be an acrylonitrile-styrene-acrylate graft copolymer (g-ASA).

The g-ASA may be obtained by adding acrylonitrile and styrene into the alkyl acrylate-based rubber and performing a graft-copolymerization on the alkyl acrylate-based rubber.

In an embodiment of the present disclosure, the acryl-based graft copolymer may be included in an amount of about 25 wt % to about 45 wt % based on the total weight (100 wt %) of a base resin including the acryl-based graft copolymer (A) and the aromatic vinyl-vinyl cyanide copolymer (B). In some embodiments, the base resin may include the acryl-based graft copolymer in an amount of about 25, 26, 27, 28, 29, 30, 31, 32, 33, 34, 35, 36, 37, 38, 39, 40, 41, 42, 43, 44, or 45 wt %. Further, according to some embodiments, the amount of the acryl-based graft copolymer may be in a range from about any of the foregoing amounts to about any other of the foregoing amounts.

When the amount is less than about 25 wt %, weather resistance and/or impact resistance may be deteriorated; but when the amount is greater than about 45 wt %, heat resistance may be deteriorated.

(B) Aromatic Vinyl-Vinyl Cyanide Copolymer

In an embodiment of the present disclosure, the aromatic vinyl-vinyl cyanide copolymer may be a copolymer of an aromatic vinyl compound and a vinyl cyanide compound. The aromatic vinyl-vinyl cyanide copolymer may have a weight average molecular weight of about 15,000 g/mol to about 400,000 g/mol. In an embodiment of the present disclosure, the weight average molecular weight is obtained by dissolving a powdery sample into tetrahydrofuran (THF) and then measuring the same using a gel permeation chromatography (GPO; Agilent Technologies 1200 series, column is Shodex LF-804 (8.0.1.D.×300 mm), and standard sample is polystyrene (manufactured by Shodex)).

Examples of the aromatic vinyl compound may include without limitation styrene, C1 to 010 alkyl-substituted styrene, halogen-substituted styrene, vinyl toluene, vinyl naphthalene, and the like, and mixtures thereof. Examples of the alkyl-substituted styrene may include without limitation α-methyl styrene, p-methyl styrene, o-ethyl styrene, m-ethyl styrene, p-ethyl styrene, p-t-butyl styrene, 2,4-dimethyl styrene, and the like, and mixtures thereof.

Examples of the vinyl cyanide compound may include without limitation acrylonitrile, methacrylonitrile, fumaronitrile, and the like, and mixtures thereof.

Examples of the aromatic vinyl-vinyl cyanide copolymer may include without limitation a copolymer of styrene and acrylonitrile; a copolymer of α-methyl styrene and acrylonitrile; and/or a copolymer of styrene, α-methyl styrene, and acrylonitrile. For example, the aromatic vinyl-vinyl cyanide copolymer may be a styrene-acrylonitrile copolymer (SAN) wherein about 65 wt % to about 75 wt % of styrene and about 25 wt % to about 35 wt % of acrylonitrile are copolymerized.

In some embodiments, the aromatic vinyl-vinyl cyanide copolymer may include styrene in an amount of about 65, 66, 67, 68, 69, 70, 71, 72, 73, 74, or 75 wt %. Further, according to some embodiments, the amount of styrene may be in a range from about any of the foregoing amounts to about any other of the foregoing amounts.

In some embodiments, the aromatic vinyl-vinyl cyanide copolymer may include acrylonitrile in an amount of about 25, 26, 27, 28, 29, 30, 31, 32, 33, 34, or 35 wt %. Further, according to some embodiments, the amount of acrylonitrile may be in a range from about any of the foregoing amounts to about any other of the foregoing amounts.

A weight average molecular weight of the styrene-acrylonitrile copolymer (SAN) may range from about 90,000 g/mol to about 150,000 g/mol.

In an embodiment of the present disclosure, the aromatic vinyl-vinyl cyanide copolymer (B) may be included in an amount of about 55 wt % to about 75 wt % based on the total weight (100 wt %) of the base resin including the acryl-based graft copolymer (A) and the aromatic vinyl-vinyl cyanide copolymer (B). In some embodiments, the base resin may include the aromatic vinyl-vinyl cyanide copolymer in an amount of about 55, 56, 57, 58, 59, 60, 61, 62, 63, 64, 65, 66, 67, 68, 69, 70, 71, 72, 73, 74, or 75 wt %. Further, according to some embodiments, the amount of the aromatic vinyl-vinyl cyanide copolymer may be in a range from about any of the foregoing amounts to about any other of the foregoing amounts.

When the amount of the aromatic vinyl-vinyl cyanide copolymer is less than about 55 wt %, coloring property and/or heat resistance may be deteriorated, and when the amount is greater than about 75 wt %, impact resistance and/or weather resistance may be deteriorated.

(C) Copolymer Including Styrene-Acrylonitrile Copolymer Graft-Copolymerized on Polystyrene+(D) Aluminum Particle In an embodiment of the present disclosure, aluminum particles may be used for realizing a metal-like texture.

The aluminum particle may be a spherical particle, and can have an average particle diameter (D50) of about 10 μm to about 50 μm, for example, an average particle diameter (D50) of about 10 μm to about 40 μm, and as another example, an average particle diameter (D50) of about 14 μm to about 40 μm. In some embodiments, the aluminum particle may have an average particle diameter (D50) of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 μm.

When the aluminum particle has an average particle diameter as noted herein, a surface roughness of a molded product of the thermoplastic resin composition, which will be described later, can be changed by the copolymer including a styrene-acrylonitrile copolymer graft-copolymerized on polystyrene, so aluminum particles are well observed (can be seen) on a surface of a molded product to realize excellent metal-like texture, and properties of impact resistance, weather resistance, and the like may be maintained with minimal or no deterioration.

In an embodiment of the present disclosure, the aluminum particle (D) may be included in an amount of about 0.1 parts by weight to about 1 part by weight based on about 100 parts by weight of the base resin including the acryl-based graft copolymer (A) and the aromatic vinyl-vinyl cyanide copolymer (B). In some embodiments, the thermoplastic resin composition may include the aluminum particles in an amount of about 0.1, 0.2, 0.3, 0.4, 0.5, 0.6, 0.7, 0.8, 0.9, or 1 parts by weight. Further, according to some embodiments, the amount of the aluminum particles may be in a range from about any of the foregoing amounts to about any other of the foregoing amounts.

When metal particle such as aluminum particle is added to the thermoplastic resin composition, the effects of impact resistance, weather resistance and the like may be deteriorated, but by adding together with (C) component, the effect of showing aluminum particles on a surface of the molded product can be enhanced, so the metal-like texture may be obtained, and also properties such as impact resistance and weather resistance may be maintained with minimal or no deterioration.

The copolymer including a styrene-acrylonitrile copolymer graft-copolymerized on polystyrene may have a weight average molecular weight of greater than or equal to about 1,000,000 g/mol. When the weight average molecular weight is greater than equal to about 1,000,000 g/mol, a surface roughness of a molded product of the thermoplastic resin composition may be increased, which can improve the metal-like texture.

In an embodiment of the present disclosure, the copolymer (C) including a styrene-acrylonitrile copolymer graft-copolymerized on polystyrene and having a weight average molecular weight of greater than or equal to about 1,000,000 g/mol may be included in an amount of about 1 part by weight to about 6 parts by weight based on about 100 parts by weight of the base resin including the acryl-based graft copolymer (A) and the aromatic vinyl-vinyl cyanide copolymer (B). In some embodiments, the thermoplastic resin composition may include the copolymer (C) in an amount of about 1, 2, 3, 4, 5, or 6 parts by weight. Further, according to some embodiments, the amount of the copolymer (C) may be in a range from about any of the foregoing amounts to about any other of the foregoing amounts.

The copolymer (C) including a styrene-acrylonitrile copolymer graft-copolymerized on polystyrene and having a weight average molecular weight of greater than or equal to about 1,000,000 g/mol and the aluminum particle (D) may be included in a weight ratio of about 100:10 to about 100:50, for example in a weight ratio of about 100:15 to about 100:35.

When the mixing weight ratio is within the above range, properties such as impact resistance, weather resistance and the like may be maintained, and excellent metal-like texture may be realized.

(E) Other Additives

The thermoplastic resin composition according to an embodiment of the present disclosure may further include an acrylonitrile-butadiene-styrene graft copolymer (g-ABS).

The acrylonitrile-butadiene-styrene graft copolymer (g-ABS) may be included in an amount of about 1 part by weight to about 10 parts by weight, for example, about 3 to about 7 parts by weight, based on about 100 parts by weight of the base resin including (A) an acryl-based graft copolymer and (B) an aromatic vinyl-vinyl cyanide copolymer. In some embodiments, the thermoplastic resin composition may include g-ABS in an amount of about 1, 2, 3, 4, 5, 6, 7, 8, 9, or 10 parts by weight. Further, according to some embodiments, the amount of g-ABS may be in a range from about any of the foregoing amounts to about any other of the foregoing amounts.

The g-ABS may include 5 wt % to 50 wt % of a butadiene-based rubbery polymer. In some embodiments, the g-ABS may include butadiene-based rubbery polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of butadiene-based rubbery polymer may be in a range from about any of the foregoing amounts to about any other of the foregoing amounts.

The average particle diameter of the butadiene-based rubbery polymer may be about 200 nm to about 340 nm. The average particle diameter of the butadiene-based rubbery polymer is measured using a photographic length of the subject particle obtained by a transmission electron microscope (TEM), and averaged from 100 subject particles. Methods for measuring average particle diameter using TEM are well known in the art and the meaning of the average particle diameter is understood by the skilled artisan.

In addition, the thermoplastic resin composition according to the present disclosure may further include one or more other additives, such as but not limited to a ultraviolet (UV) stabilizer, a fluorescent whitening agent, a release agent, a nucleating agent, an inorganic material additive, a lubricant, an antistatic agent, a heat stabilizer, an impact-reinforcing agent, a pigment, a dye, and the like, if required, without departing from the purpose of the present disclosure, and/or may be used together by mixing other resins and/or other rubber components.

Hereinafter, the present disclosure is illustrated in more detail with reference to examples and comparative examples. However, the following examples and comparative examples are provided for the purpose of illustration only and the present invention is not limited thereto.

Examples 1 to 5 and Comparative Examples 1 to 6

0.4 parts by weight of metal stearate lubricant, 0.02 parts by weight of silicone oil, 1.2 parts by weight of hindered amine-based ultraviolet (UV) stabilizer, and 2.5 parts by weight of carbon black are added as other additives in common to the components shown in Table 1 and mixed in a commonly-used mixer and extruded with a twin-screw extruder having L/D=29, Φ=45 mm at an extruding temperature of 240° C. to provide pellets. The pellets are dried in a dehumidifying dryer at 80° C. for 2 hours before the injection molding. Then a 60 oz injection molding machine is prepared by setting a cylinder temperature at 230° C. and a mold temperature at 60° C., so as to provide a specimen (for evaluating IZOD impact strength) having a size of 6.35 cm×1.25 cm×0.32 cm, a specimen (for evaluating surface impact strength) having a size of 10 cm×10 cm×0.32 cm, and a specimen (for evaluating metal texture and weather resistance) having a size of 9 cm×5 cm×0.2 cm for measuring properties. The measured properties are shown in Table 2.

TABLE 1

| Components | | Examples | | | | | Comparative Examples | | | | | |
|---|---|---|---|---|---|---|---|---|---|---|---|---|
| | | 1 | 2 | 3 | 4 | 5 | 1 | 2 | 3 | 4 | 5 | 6 |
| Acryl-based graft copolymer (A) | g-ASA (wt %) | 42 | 42 | 42 | 31 | 42 | 42 | 42 | 47 | 35 | 31 | 35 |
| Styrene-acrylonitrile copolymer (B) | SAN (wt %) | 58 | 58 | 58 | 69 | 58 | 58 | 58 | 53 | 65 | 69 | 65 |
| Acrylonitrile-butadiene-styrene graft copolymer (E) | g-ABS (parts by weight) | — | — | — | 6 | — | — | — | — | 7 | 6 | 7 |
| Polymethyl methacrylate (F) | PMMA (parts by weight) | — | — | — | — | — | — | — | 11 | 12 | — | 12 |
| Additive 1 (C) | PS-g-SAN (parts by weight) | 2 | 2 | 2 | 2 | 5 | — | — | — | — | — | — |
| Additive 2 (D-1) | Al particle-1 (parts by weight) | 0.3 | 0.7 | — | 0.7 | 0.7 | — | 0.7 | 0.7 | — | 0.7 | 0.7 |
| Additive 3 (D-2) | Al particle-2 (parts by weight) | — | — | 0.2 | — | — | — | — | — | — | — | — |
| Additive 4 (D-3) | Al particle-3 (parts by weight) | — | — | 0.5 | — | — | — | — | — | — | — | — | parts by weight: parts by weight based on 100 parts by weight of the base resin ((A)+(B))

(A): An acrylonitrile-styrene-acrylate graft copolymer (g-ASA) including a styrene-acrylonitrile copolymer graft-copolymerized on a butyl acrylate rubber having an average particle diameter of 320 nm (manufacturer: Lotte Advanced Materials Co., Ltd.).

(B): Styrene-acrylonitrile copolymer (SAN) having a weight average molecular weight of 120,000 g/mol obtained by copolymerizing 68 wt % of styrene and 32 wt % of acrylonitrile (manufacturer: Lotte Advanced Materials Co., Ltd.).

(C): Copolymer (PS-g-SAN) having a weight average molecular weight of 1,200,000 g/mol and including a styrene-acrylonitrile copolymer graft-copolymerized on polystyrene (manufacturer: Han Nanotech Co., Ltd.).

(D-1): Aluminum (Al) particle having an average particle diameter (D50) of 24 μm.

(D-2): Aluminum (Al) particle having an average particle diameter (D50) of 14 μm.

(D-3): Aluminum (Al) particle having an average particle diameter (D50) of 40 μm.

(E): Acrylonitrile-butadiene-styrene graft copolymer (g-ABS) including a styrene-acrylonitrile copolymer graft-copolymerized on a polybutadiene rubber having an average particle diameter of 270 nm (manufacturer: Lotte Advanced Materials Co., Ltd.).

(F): Polymethylmethacrylate (PMMA) resin including having a weight average molecular weight of 132,000 g/mol. (manufacturer: Arkema).

Evaluations

Each specimen obtained from Examples 1 to 5 and Comparative Examples 1 to 6 is measured for metal-like texture, surface impact strength, IZOD impact strength, and weather resistance in accordance with the following evaluating methods, and the results are shown in Table 2.

1. Metal-Like Texture

An appearance of the specimen is evaluated by the naked eye, and the metal-like texture is classified into categories from 1 to 5, wherein 1 indicates an excellent metal-like texture, and 5 indicates inferior metal-like texture.

2. Surface Impact Strength (Unit: N)

A peak force is measured according to ASTM D3763 standard by a falling dart impact test wherein a 5 kg weight pendulum falls onto the specimen from a 1 m height using a falling dart impact tester.

3. IZOD Impact Strength (Unit: kgf·cm/cm)

IZOD impact strength is measured in accordance with ASTM D256 standard for 3.2 mm-thick specimen with a notch.

4. Weather Resistance

The specimen is allowed to stand for 200 hours under the following conditions, and evaluated for weather resistance (discoloring resistance, dE) using an accelerated weathering tester (manufacturer: Suga, product name: Metaling Vertical Weather Meter MV-3000). dE, dL, da and db values are obtained by measuring L, a, and b before and after the weather resistance test using a Minolta CM-2500C color difference meter and calculating the same using the following Equation 1.

Light source: metal halide lamp
Irradiance: 55 W/m² (530 W/m² at 340 nm)
Temperature: 38° C.
Black panel temperature: 63° C.
Relative humidity: 50%
Test duration (1 cycle, 2 phases): 2 hrs/1 cycle
L: Lightness
a: red (+)<->green (−)
b: yellow (+)<->blue (−)

$$dE=\sqrt{(dL)^2+(da)^2+(db)^2}$$ [Equation 1]

In Equation 1, dE refers to a color change, dL refers to a L value difference before and after the weather resistance test, da refers to an a value difference before and after the weather resistance test, and db refers to a b value difference before and after the weather resistance test.

TABLE 2

|  | Examples | | | | | Comparative Examples | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Metal-like texture | 2 | 2 | 1 | 2 | 1 | 5 | 4 | 3 | 5 | 4 | 3 |
| Surface impact strength Peak Force (N) | 9,350 | 9,740 | 8,980 | 4,220 | 3,630 | 4,410 | 4,280 | 4,100 | 4,320 | 4,290 | 3,670 |
| IZOD impact strength (kgf·cm/cm) | 10.5 | 14.1 | 10.2 | 15.0 | 10.6 | 20.8 | 15.2 | 14.4 | 18.4 | 18.0 | 17.3 |
| Weather resistance (dE) | 1.6 | 1.5 | 2.1 | 2.5 | 1.8 | 1.4 | 1.5 | 0.8 | 2.6 | 2.7 | 2.1 |

Referring to Table 2, it is understood that the specimens using the thermoplastic resin compositions according to Examples 1 to 5 may maintain the metal-like texture at a level of 1 to 2, and also maintain the surface impact strength of greater than or equal to 3,500 N, the IZOD impact strength of greater than or equal to 10 kgf·cm/cm, and the weather resistance (dE) of less than or equal to 3, which means that properties of the impact resistance, the weather resistance and the like may be not deteriorated, and simultaneously the excellent metal-like texture may be realized.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition, comprising:
   (C) about 1 part by weight to about 6 parts by weight of a copolymer of a styrene-acrylonitrile copolymer graft-copolymerized on polystyrene and having a weight average molecular weight of greater than or equal to about 1,000,000 g/mol and
   (D) about 0.1 part by weight to about 1 part by weight of an aluminum particle,
   each based on about 100 parts by weight of a base resin including:
   (A) about 25 wt % to about 45 wt % of an acryl-based graft copolymer; and
   (B) about 55 wt % to about 75 wt % of an aromatic vinyl-vinyl cyanide copolymer.

2. The thermoplastic resin composition of claim 1, wherein the acryl-based graft copolymer (A) includes about 40 wt % to about 60 wt % of a mixture of an aromatic vinyl compound and a vinyl cyanide compound graft-copolymerized on about 40 wt % to about 60 wt % of an acryl-based rubbery polymer.

3. The thermoplastic resin composition of claim 2, wherein the acryl-based rubbery polymer of the acryl-based graft copolymer (A) has an average particle diameter of about 150 nm to about 400 nm.

4. The thermoplastic resin composition of claim 1, wherein the aromatic vinyl-vinyl cyanide copolymer (B) comprises a copolymer of styrene and acrylonitrile, a copolymer of α-methyl styrene and acrylonitrile, and/or a copolymer of styrene, α-methyl styrene, and acrylonitrile.

5. The thermoplastic resin composition of claim 4, wherein the aromatic vinyl-vinyl cyanide copolymer (B) is a styrene-acrylonitrile copolymer (SAN) wherein about 65 wt % to about 75 wt % of styrene and about 25 wt % to about 35 wt % of acrylonitrile are copolymerized.

6. The thermoplastic resin composition of claim 5, wherein the styrene-acrylonitrile copolymer (SAN) has a weight average molecular weight from about 90,000 g/mol to about 150,000 g/mol.

7. The thermoplastic resin composition of claim 1, wherein the aluminum particle has an average particle diameter (D50) from about 10 μm to about 50 μm.

8. The thermoplastic resin composition of claim 1, comprising the copolymer (C) of a styrene-acrylonitrile copolymer graft-copolymerized on polystyrene and having a weight average molecular weight of greater than or equal to about 1,000,000 g/mol and the aluminum particle (D) in a weight ratio of about 100:10 to about 100:50.

9. The thermoplastic resin composition of claim 1, comprising the copolymer (C) of a styrene-acrylonitrile copolymer graft-copolymerized on polystyrene having a weight average molecular weight of greater than or equal to about 1,000,000 g/mol and the aluminum particle (D) in a weight ratio of about 100:15 to about 100:35.

10. The thermoplastic resin composition of claim 1, further comprising about 1 part by weight to about 10 parts by weight of an acrylonitrile-butadiene-styrene graft copolymer (g-ABS) based on about 100 parts by weight of the base resin.

11. The thermoplastic resin composition of claim 10, wherein the butadiene of the acrylonitrile-butadiene-styrene graft copolymer (g-ABS) is a butadiene-based rubbery polymer having an average particle diameter of about 200 nm to about 340 nm.

12. The thermoplastic resin composition of claim 1, wherein the thermoplastic resin composition further includes at least one of an ultraviolet (UV) stabilizer, a fluorescent whitening agent, a release agent, a nucleating agent, an inorganic material additive, a lubricant, an antistatic agent, a heat stabilizer, an impact-reinforcing agent, a pigment, and a dye.

13. A molded product using the thermoplastic resin composition of claim 1.

* * * * *